April 16, 1968  R. M. WILSON  3,378,215
HANDLING AND DISPENSING DEVICE FOR WIRE AND THE LIKE
Filed Aug. 8, 1966  2 Sheets-Sheet 1
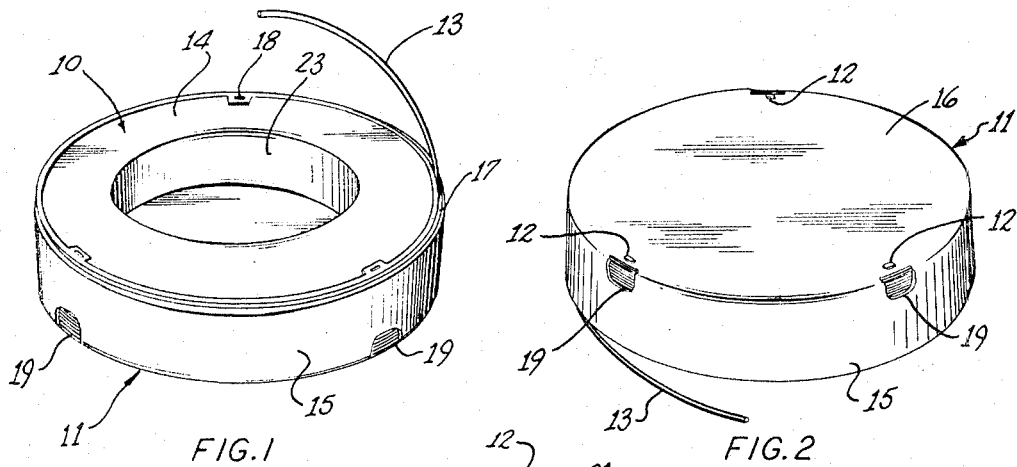
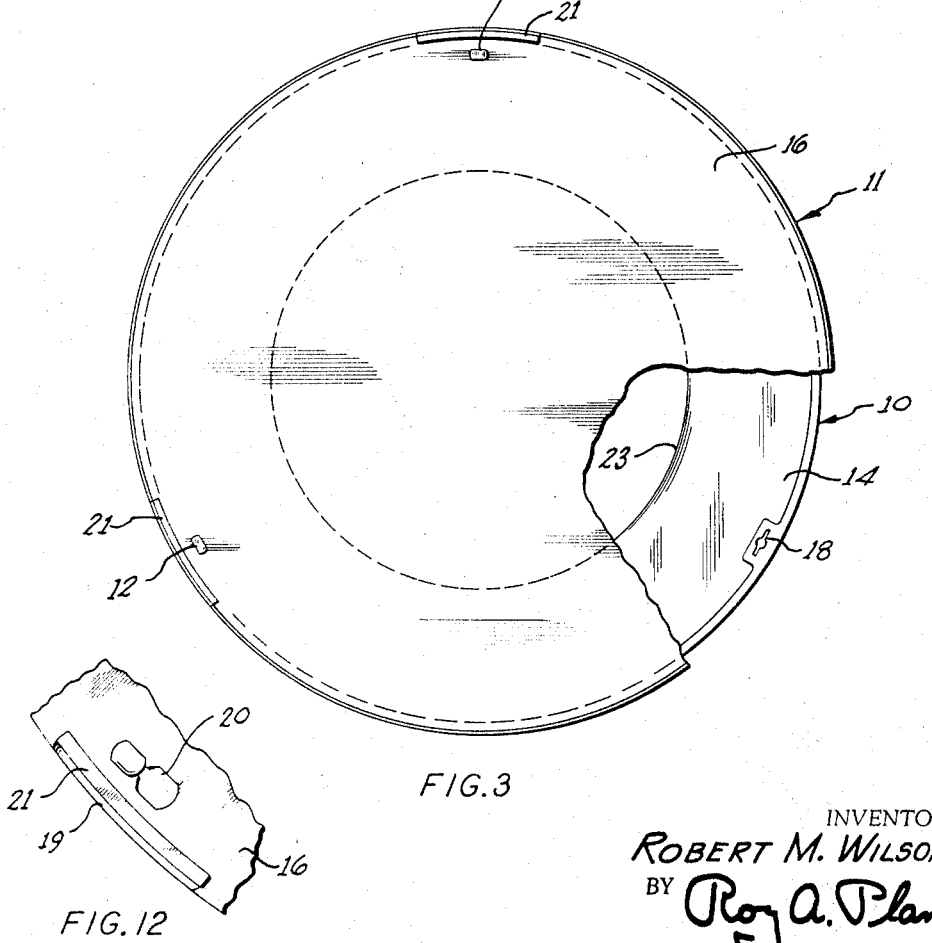
INVENTOR.
ROBERT M. WILSON
BY Roy A. Plant
ATTORNEY April 16, 1968  R. M. WILSON  3,378,215
HANDLING AND DISPENSING DEVICE FOR WIRE AND THE LIKE
Filed Aug. 8, 1966  2 Sheets-Sheet 2
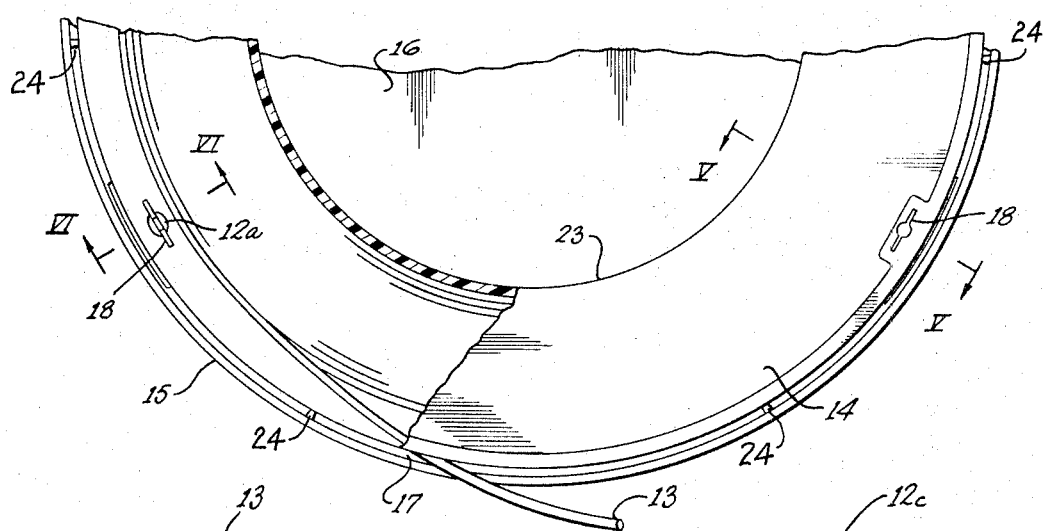
FIG. 4
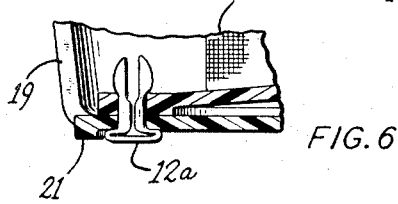
FIG. 6
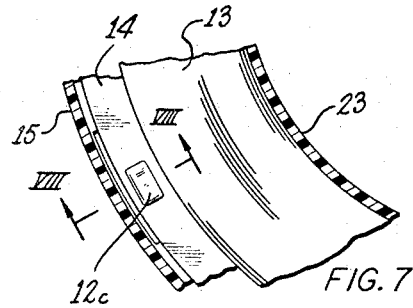
FIG. 7
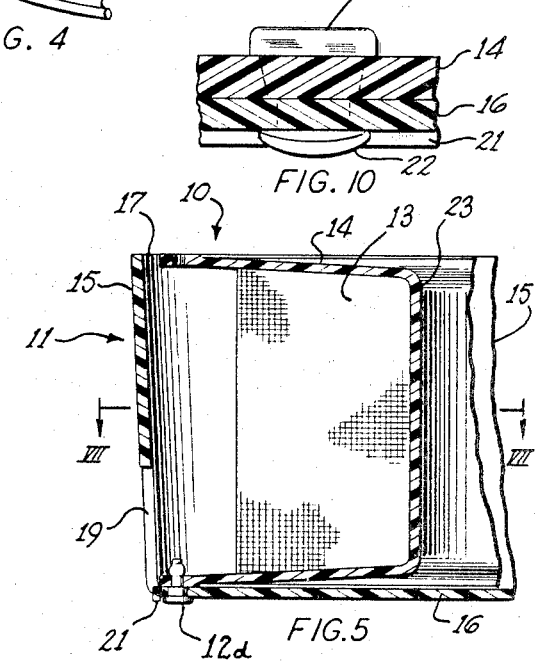
FIG. 10
FIG. 5
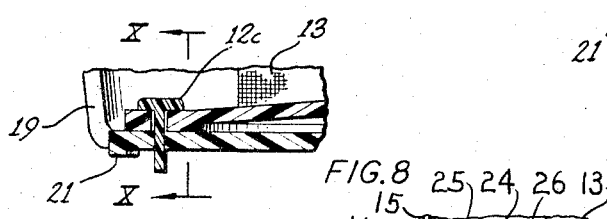
FIG. 8
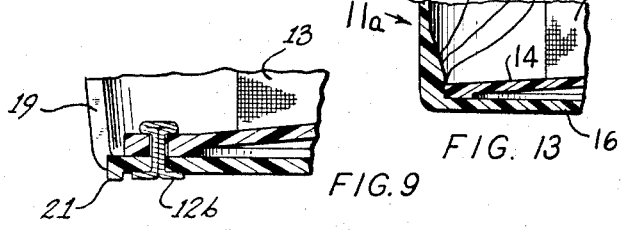
FIG. 9  FIG. 13
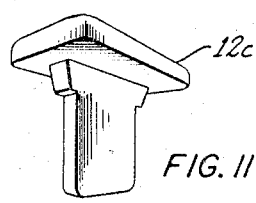
FIG. 11
INVENTOR.
ROBERT M. WILSON
BY Roy A. Plant
ATTORNEY United States Patent Office 3,378,215
Patented Apr. 16, 1968

3,378,215
HANDLING AND DISPENSING DEVICE FOR
WIRE AND THE LIKE
Robert M. Wilson, Battle Creek, Mich., assignor to Dare Products, Incorporated, Battle Creek, Mich., a corporation of Michigan
Filed Aug. 8, 1966, Ser. No. 570,975
7 Claims. (Cl. 242—171)

ABSTRACT OF THE DISCLOSURE

The present material handling and dispensing device utilizes, in combination, a spool on which the material, such as wire, is wound, and an attachable cover member into which the spool may be endwise fitted and anchored. This attachable cover member has an end panel means and an upturned flange means which will cover the outer face of the spool from end member to end member, with such flange means thus forming a barrier to prevent wire or the like wound on the spool from unwinding if the free end is released. There is a circular slit between the peripheral edge of the outer flange of the spool and the outer edge of upturned flange of the cover member so that the wire or the like can be removed from the spool through this circular slit without danger of the wire unwinding from the spool by itself. Means are provided for frictionally and/or mechanically holding the spool in said cover member under conditions of use, and yet allowing said spool to be removed and replaced with a new spool when the previous one has been emptied.

---

The present invention deals broadly with material handling and dispensing devices and more particularly with a material holding device having an attachable cover, and which is especially adapted for the storing and dispensing of elongate material such as wire.

Where wire is wound on a spool with the starting or inner end conventionally fastened and the outer end anchored in place on the spool to prevent uncoiling, the resultant product is ready for shipment and storage. However, when the outer end of the wire is released for dispensing from the spool, problems immediately arise. These difficulties come out of the tension of the wire which makes it want to uncoil or straighten out. Thus, the user must carefully hold the wire in place while he removes from the spool a piece of same of a length which he feels will fully meet his requirements. As a result, in making sure he has a long enough piece of wire to meet his requirements, he cuts off a piece of wire of a length longer than he really needs with resultant waste. At the same time he allows this cut-off piece of wire to recoil prior to using, while he holds and anchors the end of the wire remaining on the spool, since if this end of the wire is not held and fastened it will uncoil by itself and tangle. It was a recognition of this problem and the lack of a satisfactory commercial solution to same, where portable spools of wire are to be dispensed from at various locations, which led to the conception and development of the present invention.

Accordingly, among the objects of the present invention is the provision of a combination spool and cover member assembly which are anchorable together either frictionally or mechanically so that the cover extends across and guards the open face of the spool.

Another object of the present invention is to provide a spool adapted to have a self-uncoiling material, such as plain wire, wound thereon and the end of same anchored to one of the spool end members, or the like, and wherein there is a flanged pan-like cover member into which said spool of wire can be placed, with the flange of the pan-like cover member covering the wire receiving peripheral face of the spool between the end members thereof in manner such that the wire can be gradually dispensed over the peripheral edge of the outer end member of the spool and under the free edge of the flange of said pan-like cover member.

Another object is to provide a spool and flanged pan-like cover member for said spool with said flange of said cover member being wide enough to substantially completely cover the open peripheral face of the spool while allowing wire or the like goods wound on the spool between the end members of same to be unwound from same by pulling it over the peripheral edge of the outer end member of the spool and under the closely adjacent edge of said cover flange thus resisting self-unwinding of the wire on the spool while still making same available for removal by pulling as wanted.

Another object of this invention is to provide a spool and flanged pan-like cover member for same with means for releasably anchoring the inner end member of said spool frictionally to said flanged pan-like cover member, or mechanically to same at a point adjacent the outer periphery of said spool inner end member to said pan-like cover member at the side of same adjacent the flange thereof.

A further object is to provide a moderately flexible plastic spool with holes in the end members of same adjacent their peripheral edges, and a flanged pan-like cover member for same also made of a suitable plastic, with the end member of the latter adjacent its flange being provided with openings alined with those in said spool, and rivet means for anchoring said members together through said alined openings.

A further object is to provide a combination spool and flanged pan-like cover member with both perforated in alinement adjacent the peripheral edge of the inner end member of said spool for fastening together with rivets, and wherein the flange of said pan-like cover member at said alined perforations is cut away to facilitate insertion of said rivets to fasten said spool and cover member together.

A further object is to provide the flange of the pan-like cover member with inwardly projecting ribs which taper inward from the inner face of said flange and then substantially straight to the side panel with the diameter of said cover member inside said straight portions of said ribs being slightly less than the outer diameter of the inner flange of said spool so that when said spool is placed in said pan-like cover member and the inner flange of said spool brought in contact with the end face of said cover member, said ribs will frictionally grip and releasably hold said spool in said cover member.

Still further objects and advantages of this invention will appear as the description proceeds.

To the accomplishment of the foregoing and related ends the invention, then, consists of the spool and cover member features hereinafter fully described and particularly pointed out in the claims, the annexed drawings and the following description setting forth in detail certain illustrative embodiments of the invention, such disclosed embodiments illustrating, however, but several of various ways in which the principle of the invention may be used.

In the annexed drawings:

FIGURE 1 is a top perspective view of the combination spool and flanged pan-like cover member assembled and ready for the dispensing of wire or the like from the spool on which it is wound.

FIGURE 2 is a perspective view of the FIGURE 1 assembly in inverted position.

FIGURE 3 is an enlarged plan view of the inverted assembly of FIGURE 2 with part of the flanged pan-like cover member broken away to better illustrate certain details of the assembly.

FIGURE 4 is an enlarged fragmentary partially sectioned top assembly view of the flanged pan-like cover member assembled with a spool substantially filled with wire or the like with the latter being dispensed through the slit between the peripheral edge of one of the spool end members and the free edge of the flange of the pan-like cover member.

FIGURE 5 is an enlarged sectional view through the assembly of the spool and the flanged pan-like cover member as taken at line V—V of FIGURE 4, looking in the direction of the arrows.

FIGURE 6 is an enlarged sectional view as taken at line VI—VI of FIGURE 4, looking in the direction of the arrows.

FIGURE 7 is a fragmentary sectional view of a modified construction showing a different form of rivet fastening means as would be seen at line VII—VII of FIGURE 5, looking in the direction of the arrows.

FIGURE 8 is an enlarged fragmentary sectional view as taken at line VIII—VIII of FIGURE 7, looking in the direction of the arrows, and illustrating in cross section, before riveting, the use of a plastic rivet of the general type illustrated in FIGURE 11.

FIGURE 9 is an enlarged fragmentary sectional view similar to FIGURE 8 but illustrating the use of a bifurcated metal rivet with its ends expanded to releasably anchor the spool inner end member to the end member of the flanged pan-like cover member.

FIGURE 10 is an enlarged fragmentary sectional view as taken at line X—X of FIGURE 8 with the narrow end of the plastic rivet having been heated and depressed to form an anchoring head.

FIGURE 11 is an enlarged perspective view of a plastic rivet useable as shown in FIGURES 7, 8 and 10.

FIGURE 12 is an enlarged fragmentary side view of the outside face of the pan-like cover member adjacent the flange of same illustrating a keyhole slot construction with the head of a disengageable rivet shown in inverted position to that illustrated in FIGURE 10, and disengageable after relative rotary movement of said spool and pan-like cover member to bring the head of said rivet over the large end of said keyhole slot.

FIGURE 13 is an enlarged fragmentary sectional view similar to FIGURES 6, 8 and 9 but illustrating the use of inwardly projecting ribs with tapered upper portions and a substantially straight inner portion for releasably holding, through friction, the inner flange of said spool when fully entered in said flanged pan-like cover member.

Referring more particularly to FIGURES 1, 2 and 3 of the drawings it will be noted that there is shown a spool 10 inserted in cover member 11 and releasably anchored together by means of rivets 12. Spool 10 is adapted to have a resilient material such as wire 13 wound on same and dispensible over the peripheral edge of a side flange 14 of the spool 10 and from in under the outer edge of the peripheral skirt or flange 15 of cover member 11. To faciliate removal of wire 13 or the like wound on spool 10 and which is held from free escape from same by the peripheral skirt or flange 15 of cover member 11, the spool 10 and cover member 11 are preferably made of a tough and firm but moderately resilient plastic such as linear polyethylene, polystyrene, or polypropylene which will permit enough give of the two to allow the wire to be readily pulled out as needed from the spool while resisting free escape of the wire. If desired the spool and cover member could either or both be made of metal such as aluminum or magnesium or one member could be made of metal and the other of plastic. In preferred construction the skirt or flange 15 of cover member 11 flares outward slightly from the side panel 16 to facilitate molding of the cover member 11, and at the same time this provides a slit 17 through which the wire 13 can be withdrawn as clearly shown in FIGURES 1 and 4. The peripheral skirt or flange 15 of cover member 11 preferably extends completely over the peripheral edge of side flange or end member 14 of spool 10, as shown, or substantially flush with said flange or end member and it is intended that the drawings be considered as diagrammatically showing moderate variations in accordance with the spirit and obvious intent of the present invention.

Spool 10 is preferably provided with at least three equally spaced openings such as slits 18 adjacent the peripheral edge of each of the side flanges or end members 14, and FIGURES 1 and 3 show two different forms of same. These slits 18 may be used for anchoring the free outer end of the wire 13 as well as for anchoring the spool 10 to cover member 11, as will be hereinafter described, by means of various forms of rivets 12, several types of which have been illustrated. The peripheral skirt or flange 15 of cover member 11 is preferably provided with openings 19 adjacent and aligned with the openings 20 in the cover member side panel 16 which may be of various sizes and shapes for the particular rivets 12 which are being used, and one form of these openings 20 is of keyhole shape as shown in FIGURE 12, and which will be hereinafter described in connection with its use. The openings 19 are used to facilitate connecting spool 10 to cover member 11 by means of rivets 12 which can be readily snapped in place when one's fingers or a tool (not shown) are extended through opening 19 to squeeze the rivet 12 into and through the aligned holes of the spool and cover member. If desired a short rib 21 may be formed on the peripheral edge portion of side panel 16 adjacent opening 19 to not only strengthen side panel 16 at this point but also provide some protection for the exposed end of rivet 12.

One form of rivet for holding the spool 10 and cover member 11 together is shown in FIGURE 6 where the rivet 12a is of bifurcated metal spring type with sidewise projecting rounded points which will retract while being pushed through the aligned openings in the spool and cover member and will expand to releasably hold them together as soon as the appropriate length rivet is in place as shown. This particular rivet preferably has its point in the inner portion of the assembly, since if it was in reverse position, stacking of the assemblies or bumping the protruding points of the rivet might push same out of interlocking engagement and release the spool.

Another form of bifurcated rivet which can be used to hold the spool 10 and cover member 11 together is shown in FIGURE 9 where the rivet 12b is of the metal cotter pin type with its points bent outward after passage through the alined openings in the spool and cover member. This rivet 12b can have its head portion either inside the assembly, as shown, or outside with equal holding ability and the showing is intended to be considered as diagrammatically illustrating both.

While the constructions shown in FIGURES 6 and 9 have illustrated the use of two forms of bifurcated metal rivets, the invention is by no means limited to such form of the rivets since a plastic rivet 12c shown in FIGURE 11 can also be used. This rivet is shown in place in FIGURE 8 with its head inside the assembly, and in FIGURE 10 with the point of the rivet heated and formed into a holding head 22. Again this plastic rivet can be inserted in place either end to and the holding head 22 formed either inside or outside the assembly with equal holding power. Moreover, instead of the rivet being a separate member, as shown in FIGURE 11, it can be a unit part of either the spool or the cover member, and preferably the latter, and after being pushed through the adjacent alined opening of the other member (spool or cover member), its point can be heated with a suitable tool, for instance even a suitably hot soldering iron preferably having a suitable shape rivet head forming portion, to form a holding head on this rivet portion and it is intended that the drawings be considered as diagrammatically illustrating these equivalent and obvious variations.

While in the constructions above described all that was necessary was a suitable size hole 20 in side panel 16 of the cover member 11 to receive a rivet which also passed through a suitable alined opening 18 in the side flange or end member of the spool 10, it is sometimes desirable to use a different form of opening. This is illustrated in FIGURE 12 where the opening 20 is of keyhole shape so that the rivet member anchored in the spool opening can be engaged or disengaged from the cover member merely by rotating same slightly relative to each other. To engage the assembly the parts are rotated until the rivet head passes into the opening 20 following which the reel and cover member are further turned until the rivet head is over the narrow portion of the keyhole slot. Disengagement, on the other hand, takes place when the rivet head is moved, through relative rotary movement of said spool and cover member, to the large portion of the keyhole slot through which it will pass so that the spool 10 can be lifted out of the cover member 11. Any suitable size and type of rivet, metal or plastic, can be used with this disengageable form of construction, and provides a different way of assembling and disassembling the spool and cover member from that illustrated in FIGURES 6 and 9.

An alternate construction which eliminates the use of rivets, and which has been found to be commercially feasible, is shown in FIGURES 4 and 13. Here the peripheral skirt 15 of cover member 11 is provided with a multiplicity of ribs 24, preferably diametrically oppositely placed, and located at the junction of skirt 15 with side panel 16. These ribs 24, in preferred construction, each have a tapering portion 25 located along skirt 15 substantially perpendicular to side panel 16 for guiding and centering the inner side flange 14 of spool 10 in cover member 11 adjacent its side panel 16 when said spool and cover member are assembled. This tapering portion 25 preferably terminates short of reaching side panel 16, and rib 24 then extends substantially perpendicular to side panel 16 with the inner diameter of cover member 11 inside of these perpendicular portions 26 being very slightly smaller than the outside diameter of the inner side flange 14 of spool 10. With this type of construction the spool inner side flange 14 is tightly gripped and frictionally held by the inner edge portion 26 of ribs 24 to resiliently hold the spool 10 firmly in the cover member 11, while at the same time permitting the combination of spool and cover member to be taken apart for reuse of the cover member 11 with another spool 10. The cover member 11 and spool 10 are preferably made of material having sufficient toughness, firmness and resiliency to accomplish this binding together and frictional holding of said spool in said cover member under conditions of use, such as linear polyethylene, polystyrene, or polypropylene.

Where wire 13 or the like is to be removed from the spool 10 within cover member 11, the assembly can be laid on the floor, bench, or the like with the dispensing slot 17 up. Then the worker using the wire pulls out and cuts off as much as he wants and lets go of the end protruding from slot 17. When he wants some more wire he merely again picks up the projecting end of the wire and pulls the amount he wants through slot 17, cuts it off and proceeds as before. In this case the portable spool and cover assembly holds the wire supply against undesired unwinding without having to fasten the cut end each time a piece of wire was removed, a thing which would be necessary with the conventional old style supply of wire in a roll or on a spool without a cover member. The unwinding and tangling difficulties encountered with the old style supplying of wire either in rolls or on spools led to the rather common use of flat metal straps in short cut lengths in the place of wire at greater expense and with greater waste for the sake of convenience and avoidance of the unwinding problems inherent in old roll or spooled wire practice, which is completely eliminated by the present invention.

A conventional size spool 10 for the handling of twenty pounds of electric fence wire has a 10-inch peripheral diameter and a 6-inch diameter core 23, with a thickness of approximately 2¼ inches. The cover member 11 is of a diameter just sufficient under flange 15 to receive spool 10, with the cover member flange 15 being approximately 10$^{9}/_{32}$ inches in inside diameter at its free edge which leaves a $^{9}/_{64}$-inch width slit 17 over the outer peripheral edge of the outside flange or side member 14 of spool 10 and under cover member flange 15 through which to withdraw wire 13 from the spool 10. While cover member 11 has been shown with a full side panel 16, this is not essential since this side panel can have a central opening therethrough for ease of handling the assembly so long as there is enough of this panel 16 to provide adequate support and strength to stabilize flange 15 and take care of rivets 12, and it is intended that the drawings be considered as diagrammatically illustrating same. Other sizes of spools and cover members can be used for the same or different quantities of wire without departing from the spirit and scope of the invention so long as the general principles of the invention as outlined above are carried out.

At the present time, due to the uncoiling difficulties with plain rolls or spools of wire, such as electric fence wire, the maximum size rolls are only twenty pounds, while with the use of the present invention, wherein the cover member eliminates this inherent uncoiling difficulty, it is anticipated that the spools of wire will be increased to at least fifty pounds or more with reduced cost per pound of wire to the consumer.

Other modes of applying the principle of my invention may be employed instead of those explained, change being made as regards the article and combinations herein disclosed, provided the features and means stated by any of the following claims or the equivalent of such features and means be employed.

I therefore particularly point out and distinctly claim as my invention:

1. A package of nested construction for handling, storing, and dispensing, while nested, a coiled elongate material such as wire, which comprises a spool with substantially parallel outer and inner end members and a core joining same, a cover member for nestingly receiving said spool, said cover member having an end member and a continuous substantially cylindrical flange extending from the outer edge of the end member of said cover member and on one side of same, said flange being of a width at least substantially equal to the thickness of said spool between its end members at the outer periphery of same when the latter is mounted therein, and of an inside diameter sufficiently larger than the peripheral diameter of the end members of said spool to receive said spool and normally retain said coiled elongate material, such as wire, on said spool while providing a narrow annular open circumferential slit permitting said elongate material, such as wire, to be dispensed between the peripheral edge of the outer end member of said spool and the outer portion of the inside face of the substantially cylindrical flange of said cover member, and means adjacent said substantially cylindrical flange of said cover member for releasably fastening said spool and cover member together in nested dispensing position, wherein said cover member has a frictional means inside of its substantially cylindrical flange and adjacent its end member cooperating with the outer edge portion of the inner end member of said spool for releasably fastening same together in nested elongate material dispensing position, and wherein the frictional means of said cover member is in the form of wedge shaped ribs which gradually taper inward as they extend toward the end member of same, with the outer peripheral edge of the inner flange of said spool tightly fitting against said wedge shaped ribs when said spool is fully nested in said cover member.

2. The package of nested construction as set forth in claim 1, wherein there is a multiplicity of said wedge shaped ribs, preferably in pairs at opposite sides of the inner periphery of said substantially cylindrical flange of said cover member so that as said inner flange of said spool is moved toward the end member of said cover member during the nesting of same, the outer periphery of the inner flange of the spool will slide down the wedge shaped ribs and become increasingly tightly gripped in place, said spool and its cover member having sufficient resiliency to facilitate this binding and frictional gripping of the assembly together while permitting the separation of same whenever desired.

3. A package of nested construction for handling, storing, and dispensing, while nested, a coiled elongate material such as wire, which comprises a spool with substantially parallel outer and inner end members and a core joining same, a cover member for nestingly receiving said spool, said cover member having an end member and a continuous substantially cylindrical flange extending from the outer edge of the end member of said cover member and on one side of same, said flange being of a width at least substantially equal to the thickness of said spool between its end members at the outer periphery of same when the latter is mounted therein, and of an inside diameter sufficiently larger than the peripheral diameter of the end members of said spool to receive said spool and normally retain said coiled elongate material, such as wire, on said spool while providing a narrow annular open circumferential slit permitting said elongate material, such as wire, to be dispensed between the peripheral edge of the outer end member of said spool and the outer portion of the inside face of the substantially cylindrical flange of said cover member, and means adjacent said substantially cylindrical flange of said cover member for releasably fastening said spool and cover member together in nested dispensing position, wherein at least the inner end member of said spool is ribbed and provided in said ribbed portion adjacent its outer periphery with a multiplicity of substantially equally spaced openings, and said end member of said cover member is provided with openings which can be alined with the openings in said inner end member of said spool when the latter is nestedly stored in said cover member, and wherein said means for fastening said spool and cover member together includes means which extend through said alined openings of the adjacent end members of said spool and cover member and bears against the inner face of said spool inner end member and the outer face of said end member of said cover member to hold them releasably fastened together in relative position.

4. The package of nested construction as set forth in claim 3, wherein said means for fastening said spool and cover member together and which extends through said alined openings is in the form of rivet members.

5. The package of nested construction as set forth in claim 4, wherein the flange of said cover member is provided with access openings adjacent said alined openings of said spool and cover member to facilitate insertion of said rivet members therein.

6. A package of nested construction for handling, storing, and dispensing, while nested, a coiled elongate material such as wire, which comprises a spool with substantially parallel outer and inner end members and a core joining same, a cover member for nestingly receiving said spool, said cover member having an end member and a continuous substantially cyindrical flange extending from the outer edge of the end member of said cover member and on one side of same, said flange being of a width at least substantially equal to the thickness of said spool between its end members at the outer periphery of same when the latter is mounted therein, and of an inside diameter sufficiently larger than the peripheral diameter of the end members of said spool to receive said spool and normally retain said coiled elongate material, such as wire, on said spool while providing a narrow annular open circumferential slit permitting said elongate material, such as wire, to be dispensed between the peripheral edge of the outer end member of said spool and the outer portion of the inside face of the substantially cylindrical flange of said cover member, and means adjacent said substantially cylindrical flange of said cover member for releasably fastening said spool and cover member together in nested dispensing position, wherein said means for fastening said spool and cover member together consists of unitary portions of one of the adjacent end members of said spool and cover member projecting therefrom while the other of said adjacent end members has openings therethrough in position to receive said unitary projecting members with the end of same passing through said openings, and a head means on the projecting end of each of said unitary projecting members in position for holding said spool and cover member in assembled condition.

7. The package as set forth in claim 6, wherein said openings in said adjacent end member are of keyhole shape, and said head on each of said projecting members is of a size large enough to hold said spool and cover member together when in position over the narrow portion of said keyhole shape opening and yet small enough to pass through the large end portion of said keyhole shaped opening to permit assembly and disassembly of said spool and cover member combination.

References Cited

UNITED STATES PATENTS

| | | | |
|---|---|---|---|
| 347,802 | 8/1886 | Hubbard | 242—138 X |
| 2,867,319 | 1/1959 | Jones et al. | |
| 3,000,493 | 9/1961 | Hirst | 242—137 X |

FOREIGN PATENTS

| | | |
|---|---|---|
| 643,013 | 6/1962 | Canada. |
| 706,263 | 3/1965 | Canada. |

STANLEY N. GILREATH, *Primary Examiner.*